(12) United States Patent
Okano et al.

(10) Patent No.: US 12,531,231 B2
(45) Date of Patent: Jan. 20, 2026

(54) LITHIUM SECONDARY BATTERY

(71) Applicant: Panasonic Intellectual Property Management Co., Ltd., Osaka (JP)

(72) Inventors: Tetsuyuki Okano, Osaka (JP); Hajime Nishino, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 853 days.

(21) Appl. No.: 17/277,448

(22) PCT Filed: Jul. 25, 2019

(86) PCT No.: PCT/JP2019/029132
§ 371 (c)(1),
(2) Date: Mar. 18, 2021

(87) PCT Pub. No.: WO2020/066254
PCT Pub. Date: Apr. 2, 2020

(65) Prior Publication Data
US 2021/0265617 A1     Aug. 26, 2021

(30) Foreign Application Priority Data
Sep. 28, 2018   (JP) .................................. 2018-185014

(51) Int. Cl.
*H01M 4/131* (2010.01)
*H01M 4/134* (2010.01)
(Continued)

(52) U.S. Cl.
CPC ........... *H01M 4/131* (2013.01); *H01M 4/134* (2013.01); *H01M 10/052* (2013.01);
(Continued)

(58) Field of Classification Search
CPC .... H01M 4/131; H01M 4/134; H01M 10/052; H01M 10/0566; H01M 10/058; H01M 50/489; H01M 50/409
See application file for complete search history.

(56) References Cited

U.S. PATENT DOCUMENTS

2014/0186686 A1    7/2014   Takahashi et al.
2019/0103609 A1*   4/2019   Yamami ............ H01M 10/0525

FOREIGN PATENT DOCUMENTS

JP      59-181587 U    12/1984
JP      10-012279 A     1/1998
(Continued)

OTHER PUBLICATIONS

Kawamura, JP 2016-018772 Espacenet machine translation, 2016 (Year: 2016).*

(Continued)

*Primary Examiner* — Adam A Arciero
(74) *Attorney, Agent, or Firm* — WHDA, LLP

(57) ABSTRACT

A lithium secondary battery including: a positive electrode including a positive electrode current collector, and a positive electrode mixture layer containing a positive electrode active material; a negative electrode including a negative electrode current collector that faces the positive electrode; a separator disposed therebetween; and a non-aqueous electrolyte having lithium ion conductivity, wherein the positive electrode active material includes a composite oxide containing lithium and a metal M other than lithium, the metal M containing at least a transition metal, lithium metal deposits on the negative electrode during charge, and the lithium metal dissolves from the negative electrode during discharge, the positive electrode current collector has a first length in a first direction D1 and a second length in a second direction D2 intersecting the first direction, the first length (Continued)

being shorter than the second length, a spacer is provided between the positive electrode and the separator.

16 Claims, 5 Drawing Sheets

(51) Int. Cl.
    *H01M 10/052*     (2010.01)
    *H01M 10/0565*    (2010.01)
    *H01M 10/0566*    (2010.01)
    *H01M 10/058*     (2010.01)
    *H01M 50/409*     (2021.01)
    *H01M 50/489*     (2021.01)

(52) U.S. Cl.
    CPC ..... *H01M 10/0566* (2013.01); *H01M 10/058* (2013.01); *H01M 50/489* (2021.01); *H01M 10/0565* (2013.01); *H01M 50/409* (2021.01)

(56) References Cited

FOREIGN PATENT DOCUMENTS

| JP | 2013-054972 A | 3/2013 |
| JP | 2016-018772 A | 2/2016 |
| JP | 2016-139610 A | 8/2016 |

OTHER PUBLICATIONS

International Search Report dated Oct. 29, 2019, issued in counterpart application No. PCT/JP2019/029132 (2 pages).
The Extended European Search Report dated Oct. 12, 2021, issued in counterpart EP Application No. 19865455.0. (126 pages).
Jurng Sunhyung et al: "Effect of electrolyte on the nanostructure of the solid electrolyte interphase (SEI) and performance of lithium metal anodes", Energy & Environmental Sci ence, [Online] vol. 11, No. 9, Jul. 3, 2018 (Jul. 3, 2018), pp. 2600-2608, XP055846891; Cited in Extended European Search Report dated Oct. 12, 2021. (9 pages).

* cited by examiner

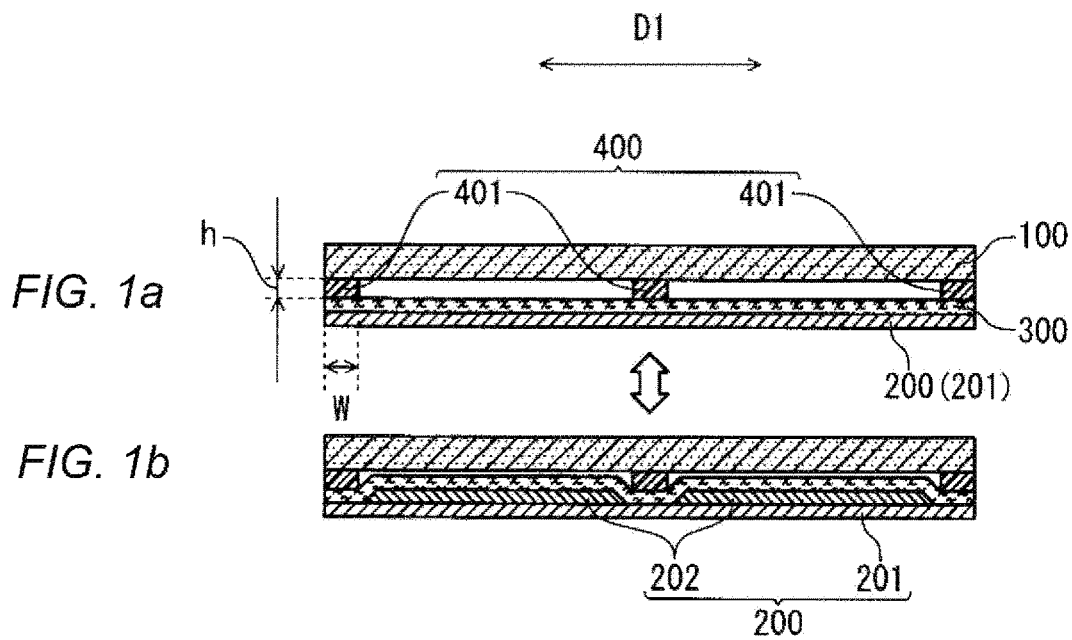
FIG. 1a
FIG. 1b
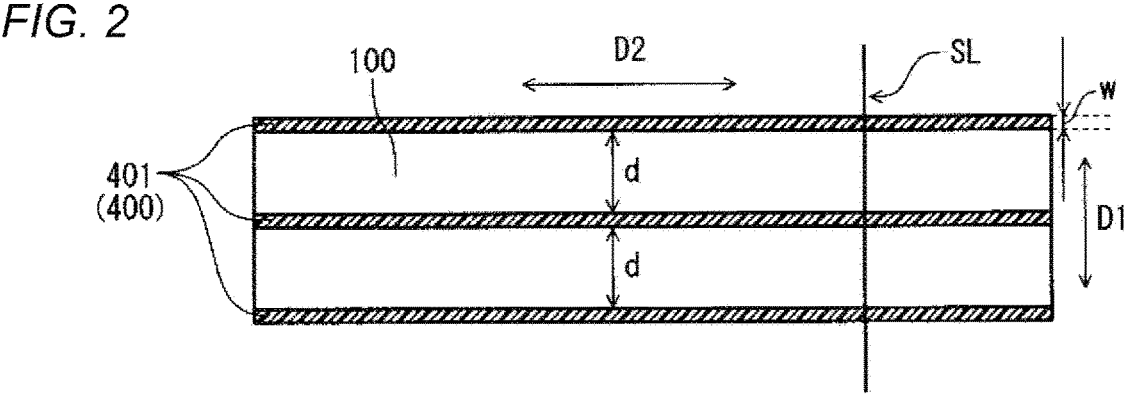
FIG. 2
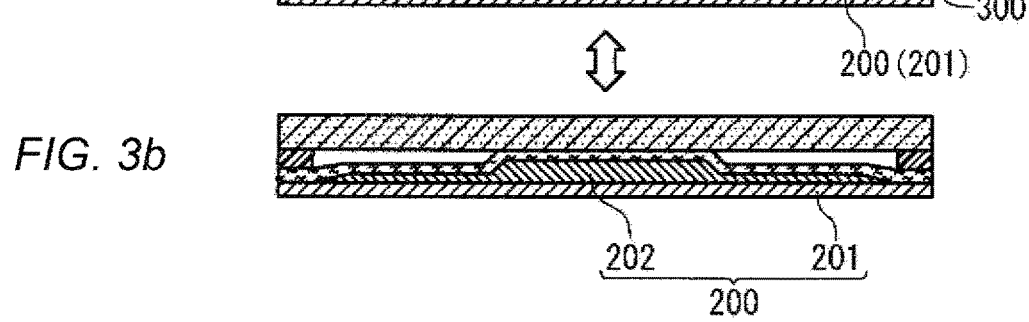
FIG. 3a
FIG. 3b

LITHIUM SECONDARY BATTERY

TECHNICAL FIELD

The present disclosure relates to a lithium secondary battery using a lithium metal as a negative electrode active material.

BACKGROUND ART

A lithium ion battery is known as a high-capacity non-aqueous electrolyte secondary battery. The capacity of the lithium ion battery can be improved by, for example, using graphite and an alloy-type active material, such as a silicon compound, in combination as a negative electrode active material. However, the improvement in capacity of the lithium ion battery is approaching to the limit.

As a non-aqueous electrolyte secondary battery superior in capacity to the lithium ion battery, a lithium secondary battery (lithium metal secondary battery) is seen as promising. In the lithium secondary battery, lithium metal deposits on the negative electrode during charge, and the lithium metal dissolves during discharge and are released as lithium ions into the non-aqueous electrolyte.

Patent Literature 1 related to a lithium secondary battery, in view of suppressing short-circuiting by preventing damage to the separator and abnormal deposition of lithium, thereby to prolong the service life of the battery, discloses providing a buffer gap between the negative or the positive electrode and the separator, so that the lithium deposited on the negative electrode surface can be accommodated therein.

CITATION LIST

Patent Literature

[PTL 1] Japanese Laid-Open Patent Publication No. H10-12279

SUMMARY OF INVENTION

Patent Literature 1, specifically, discloses forming a buffer gap by providing a spacer at both ends in the width direction of the electrode. In this case, however, it is difficult to control the morphology of lithium metal to be deposited within the buffer gap. The deposited lithium metal tends to be isolated, and the charge and discharge efficiency tends to be reduced. Moreover, the lithium metal, if deposited non-uniformly, causes the pressure between the electrodes to locally increase, and a damage, such as a crack, is likely to occur in the negative electrode current collector.

The present disclosure relates to a lithium secondary battery, including: a positive electrode including a positive electrode current collector, and a positive electrode mixture layer containing a positive electrode active material; a negative electrode including a negative electrode current collector that faces the positive electrode; a separator disposed between the positive electrode and the negative electrode; and a non-aqueous electrolyte having lithium ion conductivity, wherein the positive electrode active material includes a composite oxide containing lithium and a metal M other than lithium, the metal M containing at least a transition metal, lithium metal deposits on the negative electrode during charge, and the lithium metal dissolves from the negative electrode during discharge, the positive electrode current collector has a first length in a first direction $D1$ and a second length in a second direction $D2$ intersecting the first direction, the first length being shorter than the second length, a spacer is provided between the positive electrode and the separator so as to form a space for storing the lithium metal, between the positive electrode and the negative electrode, and a straight line SL is drawable along the first direction $D1$ so as to pass through three or more points of the spacer.

According to the present disclosure, in a lithium secondary battery, it is possible to improve the charge and discharge efficiency and reduce the damage to the negative electrode current collector.

BRIEF DESCRIPTION OF DRAWINGS

FIGS. 1a and 1b A schematic cross-sectional view of an essential part of a lithium secondary battery according to one embodiment of the present disclosure, in which FIG. 1a illustrates the battery in a discharged state, and FIG. 1b illustrates the battery in a charged state.

FIG. 2 A schematic plan view of a spacer disposed on a surface of a positive electrode.

FIGS. 3a and 3b A schematic cross-sectional view of an essential part of a lithium secondary battery of a reference embodiment, in which FIG. 3a illustrates the battery in a discharged state, and FIG. 3b illustrates the battery in a charged state.

FIGS. 4a and 4b A schematic cross-sectional view of an essential part of a lithium secondary battery of another reference embodiment, in which FIG. 4a illustrates the battery in a discharged state, and FIG. 4b illustrates the battery in a charged state.

FIG. 10a illustrates the battery in a discharged state, and FIG. 10b illustrates the battery in a charged state.

DESCRIPTION OF EMBODIMENTS

Figure 4A:
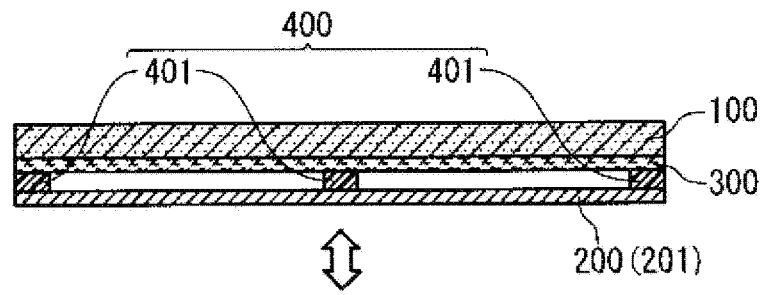

A lithium secondary battery according to the present disclosure includes: a positive electrode including a positive electrode current collector, and a positive electrode mixture layer containing a positive electrode active material; a negative electrode including a negative electrode current collector that faces the positive electrode; a separator disposed between the positive electrode and the negative electrode; and a non-aqueous electrolyte having lithium ion conductivity. Lithium metal deposits on the negative electrode during charge, and the lithium metal dissolves from the negative electrode during discharge. The positive electrode current collector has a first length in a first direction $D1$ and a second length in a second direction $D2$ intersecting the first direction $D1$, the first length being smaller than the second length. The positive electrode current collector is, for example, long rectangular, or belt-shaped. The first direction $D1$ and the second direction $D2$ form an angle of approximately 90°. For example, the angel may be 88 to 92°.

The positive electrode active material includes a composite oxide containing lithium and a metal M other than lithium, the metal M including at least a transition metal. Such a composite oxide is hereinafter referred to as a lithium-containing transition metal oxide. Lithium contained in the lithium-containing transition metal oxide is released as lithium ions during charge from the positive electrode, and deposits as lithium metal on the negative electrode or the negative electrode current collector. During discharge, the lithium metal dissolves from the negative electrode, and lithium ions are released, which are then absorbed to the composite oxide in the positive electrode. In short, the lithium ions involved in charge and discharge are mostly derived from the solute in the non-aqueous electrolyte and the positive electrode active material. Therefore, when the lithium-containing transition metal oxide has, for example, a rock-salt type crystal structure having a layered structure, a molar ratio mLi/mM of a total amount mLi of the lithium present in the positive and negative electrodes to an amount mM of the metal M present in the positive electrode is preferably 1.1 or less.

Here, a spacer is provided between the positive electrode and the separator so as to form a space for storing the lithium metal, between the positive electrode and the negative electrode. Given that a straight line SL is drawn along the first direction D1, the line is drawable so as to pass through three or more points (preferably 4 or more points, more preferably 5 or more points) of the spacer. When the spacer is provided as above between the positive electrode and the separator, lithium metal is unlikely to deposit non-uniformly or in a dendritic form during discharge, and a local expansion of the negative electrode is suppressed, making a damage, such as a crack, unlikely to occur in the negative electrode current collector. For example, when three protruding portions each line-shaped along the second direction D2 are provided as the spacer in substantially parallel with each other, the straight line SL drawn along the first direction D1 passes through three points of the spacer. The spacer may be provided on a surface of the positive electrode current collector, or on a surface of the positive electrode mixture layer supported on the positive electrode current collector and containing the positive electrode active material.

On the other hand, in a lithium secondary battery in which the spacer portions are provided only at both ends in the width direction of the electrode, the deposition morphology of the lithium metal during charge is difficult to control, and lithium metal may deposit non-uniformly on the negative electrode. Especially when the lithium metal is deposited in a dendritic form, it tends to be isolated during discharge, which is likely to cause a reduction in charge-discharge efficiency. Moreover, the expansion of the negative electrode tends to be severe locally, which is likely to cause a damage, such as a crack, to the negative electrode current collector.

In the present disclosure, the spacer is provided between the positive electrode and the separator. Therefore, at least during discharge, a space is easily secured between the positive electrode and the separator. On the other hand, the space is hardly secured between the negative electrode and the separator. Thus, the lithium metal deposited on the negative electrode surface is constantly subjected to a pressing force from the separator and tends to grow along the surface of the negative electrode, which is thus unlikely to grow in a dendritic form. Here, due to its moderate stretchability, the separator stretches toward the positive electrode with increase in the amount of the deposited lithium metal. This can fill the space formed by the spacer between positive electrode and the separator.

Furthermore, the straight line SL can be drawn along the first direction D1 so as to pass through three or more points of the spacer. This means that the spacer can support the separator and the negative electrode current collector at many points, allowing the whole lithium metal to be subjected to a comparatively uniform pressing force from the separator. Therefore, the lithium metal is more likely to deposit along the surface of the negative electrode. Moreover, since the negative electrode current collector is supported by the spacer at many points, the deformation of the negative electrode current collector itself can also be suppressed. Consequently, the load applied to the negative electrode current collector can be significantly reduced.

The spacer has a height h as measured from a portion having a maximum thickness of the positive electrode. The height h is, for example, 15 μm to 100 μm, and may be 30 μm to 60 μm, in view of securing a necessary minimum space. The height h is determined as appropriate depending on the capacity per unit area of the positive electrode. Here, the height h is usually measured from the surface of the positive electrode mixture layer supported on the positive electrode current collector. The height h may be determined as an average of the values measured at randomly selected 10 points.

In the straight line SL passing through three points or more of the spacer, a ratio d/h of a shortest distance d (μm) between portions of the spacer adjacent to each other to the height h (μm) of the spacer as measured from a portion having a maximum thickness of the positive electrode is, for example, 10 to 800, and may be 40 to 400. By controlling the ratio d/h within the range above, a sufficient space necessary for storing the lithium metal can be easily secured, and a more uniform pressing force can be applied to the whole lithium metal from the separator. The shortest distance d between portions of the spacer adjacent to each other may be determined as an average of the values measured in one site on each of ten straight lines SL drawn at random.

When an opposing area S between the positive electrode and the negative electrode is denoted by S, a ratio s/S of an area s of a positive electrode portion covered with the spacer to the opposing area S is, for example, 0.05 to 0.2 (i.e., 5% to 20%). By controlling the percentage of the area s within the range above, a more uniform pressing force can be applied to the whole lithium metal from the separator, and the resistance to the electrode reaction can be suppressed. The ratio s/S may satisfy the above range on one surface or both surfaces of the positive electrode.

A ratio l/L of a length l occupied by the spacer in the straight line SL passing through three or more points of the spacer to the first length L is, for example, 0.05 to 0.2 (5% to 20%). This allows the whole lithium metal to be subjected to a more uniform pressing force from the separator. The length l may be determined as an average of the values measured on ten straight lines SL drawn at random. The ratio l/L may satisfy the above range on one surface or both surfaces of the positive electrode.

The spacer may comprise, for example, a plurality of line-shaped protruding portions disposed in stripes along the second direction D2 on a surface of the positive electrode. For example, a protruding portion may be disposed at each of both ends in the first direction D1 on the surface of the positive electrode, and additionally disposed along the second direction D2 midway between the both ends (three protruding portions in total). In this case, the straight line SL can be drawn so as to pass through three points in total of the spacer: two at the both ends and one between the both ends. The spacer comprising such a plurality of line-shaped protruding portions can be relatively easily formed on a surface of the positive electrode. Furthermore, in the case of forming a plurality of line-shaped protrusions, it is easy to control the height h, the ratio d/h, the ratio s/S, the ratio l/L, and other parameters.

A description will be given below with reference to the drawings.

FIGS. 1a and 1b are schematic cross-sectional view of an essential part of a lithium secondary battery according to one embodiment of the present disclosure, in which FIG. 1a illustrates the battery in a discharged state, and FIG. 1b illustrates the battery in a charged state. The essential part of the lithium secondary battery includes a positive electrode 100, a negative electrode 200, a separator 300 interposed between the positive electrode 100 and the negative electrode 200, and a non-aqueous electrolyte (not shown). The negative electrode 200, in a discharged state, includes a negative electrode current collector 201 (see FIG. 1a), and in a charged state, includes the negative electrode current collector 201 and lithium metal 202 deposited thereon (see FIG. 1b). A spacer 400 is interposed between the positive electrode 100 and the separator 300. The spacer 400 provides a space for storing the lithium metal 202, between the positive electrode 100 and the negative electrode 200.

FIG. 2 is a schematic plan view of the spacer 400 disposed on a surface of the positive electrode surface 100. The spacer 400 comprises line-shaped protruding portions 401 along the second direction D2 provided at both ends in the first direction D1 on the surface of the positive electrode 100 and a line-shaped protruding portion 401 along the second direction D2 provided midway between the both ends. In short, the spacer 400 consists of three of the line-shaped protruding portions 401 which are substantially parallel with each other. Thus, the straight line SL drawn along the first direction D1 passes through three points of the spacer 400. Here, being substantially parallel with each other means being in an approximate parallel state, and the line-shaped protruding portions 401 may intersect one another at an angle of, for example, 0° to 20°, or 0° to 10°.

In a discharged state FIG. 1a, a space is secured between the positive electrode 100 and the separator 300 by the spacer 400. On the other hand, between the negative electrode current collector 201 and the separator 300, almost no space is observed. In a charged state FIG. 1b, the lithium metal 202 is deposited on the surface of the negative electrode current collector 201. The lithium metal 202 is constantly subjected to a pressing force from the separator 300 and is facilitated to grow along the surface of the negative electrode. With increase in the amount of the deposited lithium metal 202, the separator 300 stretches (bulges) toward the positive electrode, gradually filling the space secured by the spacer 400. At this time, the protruding portion 401 provided midway between the both ends in the first direction D1 plays an important role. Specifically, the spacer 400 can support the negative electrode current collector 201 and the separator 300 at greater points, allowing the lithium metal 202 to be subjected to a more uniform pressing force. This can suppress a local deposition of the lithium metal 202 and facilitate the deposition of lithium metal along the surface of the negative electrode current collector 201, as well as can suppress the deformation of the negative electrode current collector.

On the other hand, a schematic cross-sectional view of an essential part of a lithium secondary battery of a reference embodiment is shown in FIGS. 3a and 3b, in which FIG. 3a illustrates the battery in a discharged state, and FIG. 3b illustrates the battery in a charged state. Again, the essential part of the lithium secondary battery includes the positive electrode 100, the negative electrode 200, the separator 300 interposed between the positive electrode 100 and the negative electrode 200, and the non-aqueous electrolyte (not shown). The spacer 400 is interposed between the positive electrode 100 and the separator 300. Here, however, the spacer 400 consists only of the line-shaped protruding portions 401 along the second direction D2 provided respectively at both ends in the first direction D1 on the surface of the positive electrode 100. No line-shaped protruding portion 401 is provided midway between the both ends. Thus, the straight line SL drawn along the first direction D1 passes through only two points of the spacer 400. In this case, in a charged state FIG. 3b, although the lithium metal 202 is partially subjected to a pressing force from the separator 300, the pressing force from the separator 300 applied in a midway region in the first direction D1 is not sufficient enough, and a local deposition of lithium metal tends to occur in the midway region. On the other hand, the stretchability of the separator 300 is limited. Therefore, when the separator 300 is going to bulge greatly toward the positive electrode in the midway region, an excessive stress is applied to the negative electrode current collector 201, and a fatal crack is likely to occur in the negative electrode current collector 201.

Figure 4B:
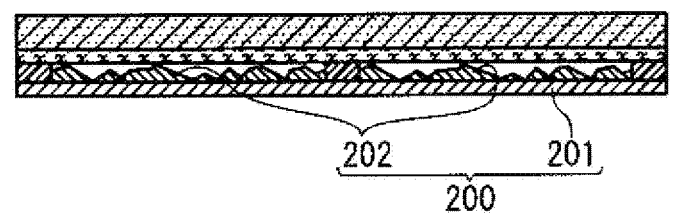

FIGS. 4a and 4b are schematic cross-sectional view of an essential part of a lithium secondary battery of another reference embodiment, in which FIG. 4a illustrates the battery in a discharged state, and FIG. 4b illustrates the battery in a charged state. Here, the essential part of the lithium secondary battery includes the positive electrode 100, the negative electrode 200, the separator 300 interposed between the positive electrode 100 and the negative electrode 200, and the non-aqueous electrolyte (not shown). The spacer 400 is interposed between the negative electrode current collector 201 and the separator 300. In this case, in a charged state FIG. 4b, the lithium metal 202 is not subjected to a sufficient pressing force from the separator 300, and the lithium metal 202 tends to deposit non-uniformly or in a dendritic form. Especially when the lithium metal 202 is deposited in a dendritic form, it tends to be isolated during discharge, which is likely to cause a reduction in charge-discharge efficiency. Moreover, as the lithium metal 202 deposited in a dendritic form grows, it may break the separator 300, causing a short-circuit between the positive electrode 100 and the negative electrode 200.

Although not specifically illustrated in FIGS. 1a, 1b and 2, the positive electrode 100 includes a positive electrode current collector and a positive electrode mixture layer supported on the positive electrode current collector, and the positive electrode active material is contained in the positive electrode mixture layer. The height h of the spacer as measured from a portion having a maximum thickness of the positive electrode 100 corresponds to a height from a surface of the positive electrode mixture layer. In the straight line SL, the shortest distance d between portions of the spacer 400 adjacent to each other corresponds to a shortest distance between the adjacent protruding portions 401. The area s of a portion covered with the spacer 400 of the positive electrode 100 corresponds to an area of the three protruding portions 401 projected onto the positive electrode 100. The length l occupied by the spacer 400 in the straight line SL corresponds to a total (3w) of the widths w in the first direction D1 of the three protruding portions 401.

FIGS. 5 to 8 show various spacers disposed on the positive electrode surface.

Figure 5:
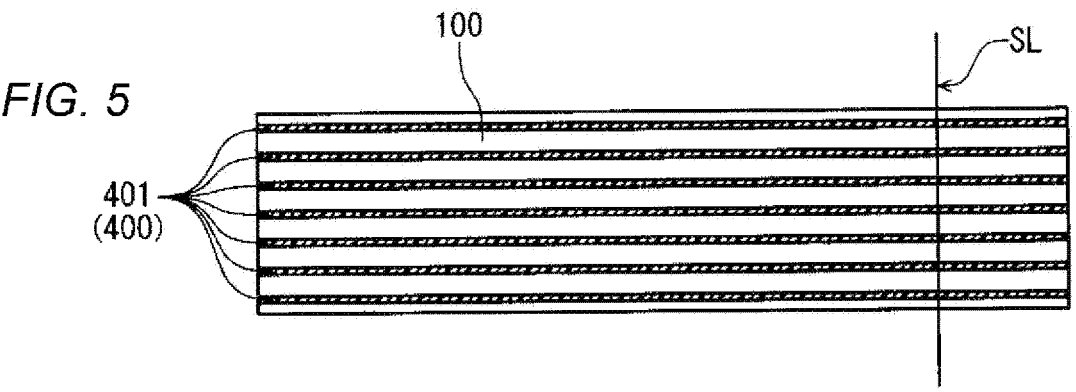
FIG. 5 A schematic plan view of another spacer disposed on the positive electrode surface.

In FIG. 5, the spacer 400 comprises a plurality of line-shaped protruding portions 401 disposed in stripes along the second direction D2 on the surface of the positive electrode 100. In this case, the straight line SL can be drawn so as to pass through the same number of points (seven points in the illustrated example) as that of the protruding portions 401. The areas of a portion covered with the spacer 400 of the positive electrode 100 corresponds to an area of the seven protruding portions 401 projected onto the positive electrode 100. The length l occupied by the spacer 400 in the straight line SL corresponds to a total (7w) of the widths w in the first direction D1 of the seven protruding portions 401.

Figure 6:
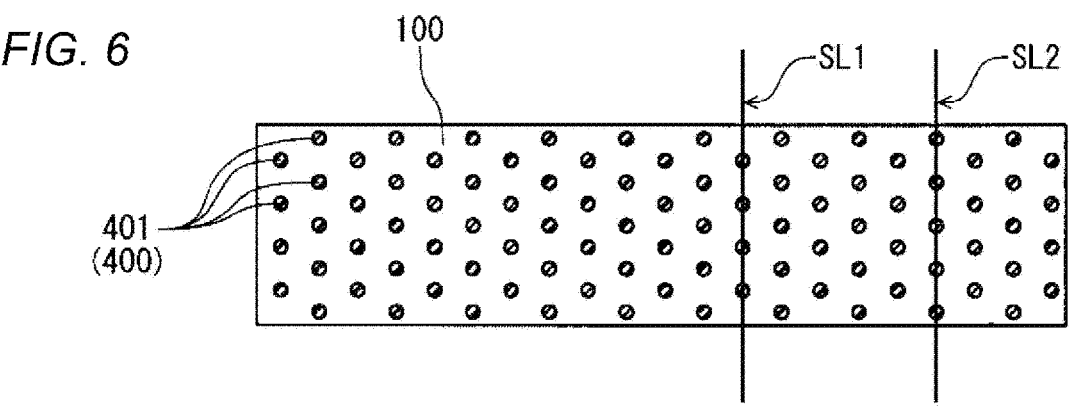
FIG. 6 A schematic plan view of still another pacer disposed on the positive electrode surface.

In FIG. 6, the spacer 400 comprises a plurality of spot-shaped protruding portions 401 disposed so as to be distributed uniformly on the surface of the positive electrode 100. In the case of the illustrated example, when a straight line SL is drawn along the first direction D1, the number of the spot-shaped protruding portions 401 that the straight line SL passes through differs depending on where the straight line SL is drawn. A straight line SL1 passes through four of the protruding portions 401, and a straight line SL2 passes through five of the protruding portions 401. In such a case, of a plurality of the straight lines SL drawable in different styles, at least one of the straight lines SL should pass through three or more protruding portions. The area s of a portion covered with the spacer 400 of the positive electrode 100 corresponds to a total area of the spot-shaped protruding portions 401 projected onto the positive electrode 100. The length l occupied by the spacer 400 in the straight line SL corresponds to a product of an average number of protruding portions that each of the straight lines SL drawable in different styles passes through (the average is 4.5 in the illustrated example) and a diameter in the first direction D1 of the spot-shaped protruding portions 401.

Figure 7:
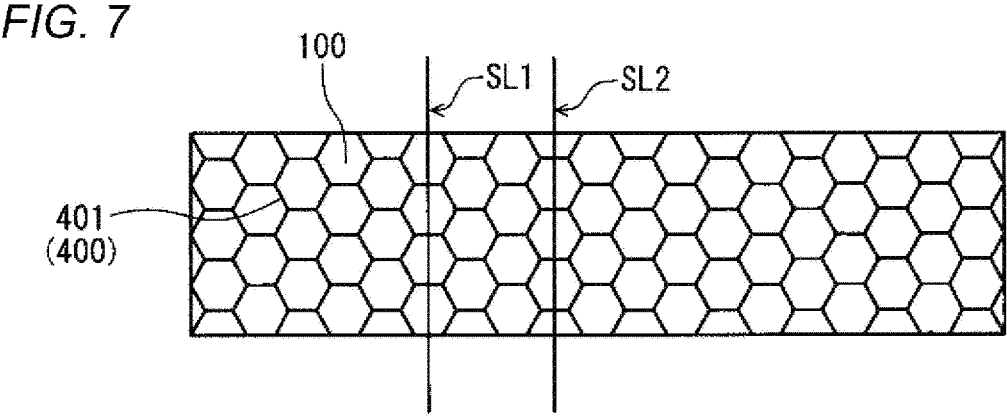
FIG. 7 A schematic plan view of still another spacer disposed on the positive electrode surface.

In FIG. 7, the spacer 400 comprises a continuous form of honeycomb-shaped ribs disposed so as to be distributed uniformly on the surface of the positive electrode 100. In this case, too, when a straight line SL is drawn along the first direction D1, the number of ribs that the straight line SL passes through differs depending on where the straight line SL is drawn. A straight line SL1 passes through the ribs at five points, and a straight line SL2 passes through the ribs at four points. The area s of a portion covered with the spacer 400 of the positive electrode 100 corresponds to an area of the continuous form projected onto the positive electrode 100. The length l occupied by the spacer 400 in the straight line SL corresponds to a product of an average number of ribs that each of the straight lines SL drawable in different styles passes through (the average is 4.5 in the illustrated example) and a rib width of the continuous form.

Figure 8:
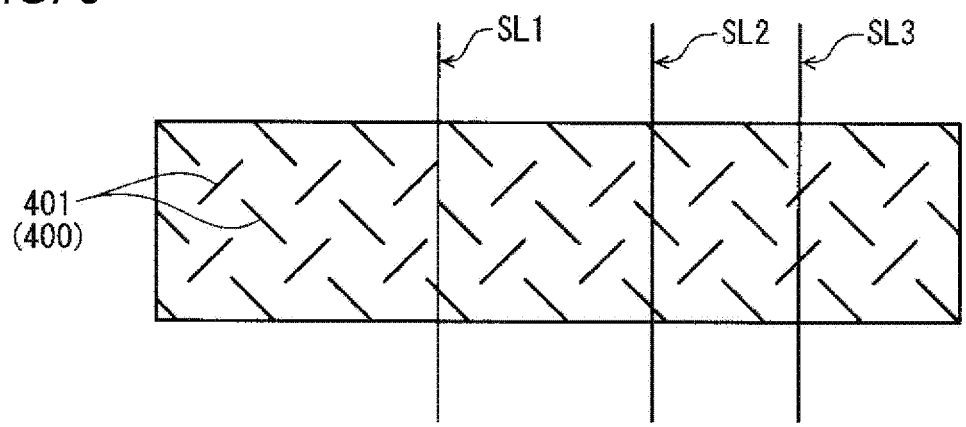
FIG. 8 A schematic plan view of still another spacer disposed on the positive electrode surface.

In FIG. 8, the spacer 400 comprises a plurality of line segment-shaped protruding portions 401 disposed so as to be distributed uniformly on the surface of the positive electrode 100. The line segment-shaped protruding portions 401 are arranged so as to intersect alternately along the first direction D1. In this case, too, when a straight line SL is drawn along the first direction D1, the number of the line segment-shaped protruding portions 401 that the straight line SL passes through differs depending on where the straight line SL is drawn. For example, a straight line SL1 passes through three or four of the line segment-shaped protruding portions 401, a straight line SL2 passes through three of the protruding portions 401, and a straight line SL3 passes through two of the protruding portions 401. The areas of a portion covered with the spacer 400 of the positive electrode 100 corresponds to a total area of the line segment-shaped protruding portions 401 projected onto the positive electrode 100. The length l occupied by the spacer 400 in the straight line SL corresponds to a product of an average number of the protruding portions that each of the straight lines SL drawable in different styles passes through and a width of the protruding portions in a cross section taken along the straight line SL.

A detailed description will be given below of each component of the lithium secondary battery.

[Negative Electrode]

The negative electrode includes a negative electrode current collector. In the lithium secondary battery, lithium metal deposits on a surface of the negative electrode current collector during charge. Specifically, lithium ions contained in the non-aqueous electrolyte receive electrons on the negative electrode current collector during charge and become lithium metal, which deposits on the surface of the negative electrode current collector. The lithium metal deposited on the surface of the negative electrode current collector dissolves as lithium ions during discharge in the non-aqueous electrolyte. The lithium ions present in the non-aqueous electrolyte may be either derived from a lithium salt added to the non-aqueous electrolyte or supplied from the positive electrode active material during charge, or both.

The negative electrode current collector is in the form of an electrically conductive sheet. The conductive sheet may be a foil, film, and the like.

The conductive sheet may have a smooth surface. In this case, the lithium metal derived from the positive electrode tends to uniformly deposit on the conductive sheet during charge. The smooth surface means that the conductive sheet has a maximum height roughness Rz of 20 µm or less. The conductive sheet may have a maximum height roughness Rz of 10 µm or less. The maximum height roughness Rz is measured in accordance with JIS B 0601: 2013.

The negative electrode current collector (conductive sheet) is made of an electrically conductive material other than lithium metal and lithium alloys. The conductive material may be a metal material, such as metal and an alloy. The conductive material preferably causes no reaction with lithium. Specifically, a material that forms neither an alloy nor an intermetallic compound with lithium is preferred. Such a conductive material is exemplified by copper (Cu), nickel (Ni), iron (Fe), and an alloy of one or more of these metal elements, or graphite having a basal plane predominately exposed on its surface. Examples of the alloy include a copper alloy and stainless steel (SUS). Preferred are copper and/or a copper alloy because of its high electrical conductivity.

The negative electrode current collector may have any thickness; the thickness is, for example, 5 µm or more and 300 µm or less.

The negative electrode current collector may have a negative electrode mixture layer (not shown) on its surface. The negative electrode mixture layer is formed by, for example, applying a paste including a negative electrode active material, such as graphite, to at least part of a surface of the negative electrode current collector. In view of achieving a lithium secondary battery superior in capacity to the lithium ion battery, however, the negative electrode mixture layer is formed sufficiently thin so that lithium metal can deposit on the negative electrode.

[Positive Electrode]

The positive electrode includes, for example, a positive electrode current collector and a positive electrode mixture layer supported on the positive electrode current collector. The positive electrode mixture layer contains, for example, a positive electrode active material, an electrically conductive material, and a binder. The positive electrode mixture layer may be formed on one surface or both surfaces of the positive electrode current collector. The positive electrode can be obtained by, for example, applying a positive electrode mixture slurry including a positive electrode active material, an electrically conductive material, and a binder to both surfaces of the positive electrode current collector, followed by drying and then rolling the dry applied film.

The positive electrode active material absorbs and releases lithium ions. Examples of the positive electrode active material include a lithium-containing transition metal oxide, a transition metal fluoride, a polyanion, a fluorinated polyanion, and a transition metal sulfide. Preferred among them is a lithium-containing transition metal oxide in terms of its low production cost and high average discharge voltage.

Examples of the transition metal oxide contained in the lithium-containing transition metal oxide include Sc, Ti, V, Cr, Mn, Fe, Co, Ni, Cu, Y, Zr, and W. The lithium-containing transition metal oxide may contain one kind or two or more kinds of transition metal elements. The transition metal element may be Co, Ni and/or Mn. The lithium-containing transition metal oxide can contain one or more kinds of typical elements, as needed. Examples of the typical element includes Mg, Al, Ca, Zn, Ga, Ge, Sn, Sb, Pb, and Bi. The typical element may be Al, and the like.

The lithium-containing transition metal oxide preferably contains Co, Ni and/or Mn as a transition metal element(s) and Al as an optional component and has a rock-salt type crystal structure having a layered structure, in view of achieving a high capacity. In this case, in the lithium secondary battery, a molar ratio mLi/mM of a total amount mLi of the lithium present in the positive and negative electrodes to an amount mM of a metal M other than lithium present in the positive electrode is set, for example, 1.1 or less.

The conductive material is, for example, a carbon material. Examples of the carbon material include carbon black, acetylene black, Ketjen Black, carbon nanotube, and graphite.

The binder may be, for example, a fluorocarbon resin, a polyacrylonitrile, a polyimide resin, an acrylic resin, a polyolefin resin, and a rubbery polymer. Examples of the fluorocarbon resin include polytetrafluoroethylene and polyvinylidene fluoride.

The positive electrode mixture layer has a surface having a maximum height roughness Rz of, for example, 10 μm or less, so that the spacer can be easily disposed on the surface of the positive electrode. The maximum height roughness Rz is measured in accordance with JIS B 0601: 2013.

The positive electrode current collector is in the form of an electrically conductive sheet. The conductive sheet may be a foil, film, and the like. The positive electrode current collector may be coated with a carbon material.

The positive electrode current collector (conductive sheet) may be made of, for example, a metal material, such as Al, Ti, and Fe. The metal material may be Al, an Al alloy, Ti, a Ti alloy, a Fe alloy, and the like. The Fe alloy may be stainless steel (SUS).

The positive electrode current collector may have any thickness: the thickness is, for example, 5 μm or more and 300 μm or less.

[Spacer]

The spacer may be made of any material. The spacer may be made of an electrically conductive material and/or an electrically insulating material.

The conductive material may be selected as appropriate from those exemplified as the material of the negative electrode current collector or the positive electrode current collector. The spacer may be provided by press-working the positive electrode current collector, to form a protruding portion(s). Alternatively, an electrically conductive paint may be applied or an electrically conductive tape may be attached to a surface of the positive electrode mixture layer.

The insulating material is, for example, a resin material. Examples of the resin material include a polyolefin resin, an acrylic resin, a polyamide resin, a polyimide resin, a silicone resin, and a fluorocarbon resin. The resin material may be a cured product of a curable resin, such as an epoxy resin. These resin materials may be mixed with an inorganic filler and the like. The spacer can be formed by, for example, attaching a resin adhesive tape to a surface of the positive electrode current collector or the positive electrode mixture layer. The spacer may be formed by applying a solution or dispersion including the resin material to a surface of the positive electrode current collector or the positive electrode mixture layer, followed by drying. The spacer may be formed by applying a curable resin in a desired shape to a surface of the positive electrode current collector or the positive electrode mixture layer, followed by curing.

[Separator]

The separator is a porous sheet having ion permeability and electrically insulating properties. The porous sheet may be, for example, a microporous thin film, a woven fabric, and a nonwoven fabric. The separator is made of any material; the material may be a polymer material. Examples of the polymer material include an olefinic resin, a polyamide resin, and a cellulose. Examples of the olefinic resin include polyethylene, polypropylene, and an ethylene-propylene copolymer. The separator may include an additive, if necessary. The additive is, for example, an inorganic filler.

[Non-Aqueous Electrolyte]

The non-aqueous electrolyte having lithium ion conductivity includes, for example, a non-aqueous solvent, and lithium ion and an anion dissolved in the non-aqueous solvent. The non-aqueous electrolyte may be liquid, and may be gel.

The liquid non-aqueous electrolyte can be prepared by dissolving a lithium salt in the non-aqueous solvent. When the lithium salt is dissolved in the non-aqueous solvent, lithium ion and an anion are produced.

The gel non-aqueous electrolyte includes a lithium salt and a matrix polymer, or includes a lithium salt, a non-aqueous solvent, and a matrix polymer. The matrix polymer is, for example, a polymer material that is gelled by absorbing the non-aqueous solvent. Examples of the polymer material include a fluorocarbon resin, an acrylic resin, and a polyether resin.

The lithium salt or anion may be any known in the art that is utilized for non-aqueous electrolyte for lithium secondary batteries. Specific examples thereof include: $BF_4^-$, $ClO_4^-$, $PF_6^-$, $CF_3SO_3^-$, $CF_3CO_2^-$, imide anions, and an anion of an oxalate complex. Examples of the imide anions include $N(SO_2CF_3)_2^-$, $N(C_mF_{2m+1}SO_2)_x(C_nF_{2n+1}SO_2)_y^-$, where m and n are independently 0 or an integer of 1 or more, x and y are independently 0, 1 or 2, and x+y=2. The oxalate complex anion may contain boron and/or phosphorus. Examples of the oxalate complex anion include a bis(oxalato)borate anion, $BF_2(C_2O_4)^-$, $PF_4(C_2O_4)^-$, and $PF_2(C_2O_4)_2^-$. The non-aqueous electrolyte may include one of these anions, or two or more kinds thereof.

In view of suppressing the dendritic deposition of lithium metal, the non-aqueous electrolyte preferably includes at least an anion of an oxalate complex. The oxalate complex anion interacts with lithium to make lithium metal more likely to deposit uniformly in a fine particulate state. Therefore, a local deposition of lithium metal is unlikely to occur. The oxalate complex anion may be used in combination with one or more other anions, for example, PF&- and/or imide anions.

Examples of the non-aqueous solvent include esters, ethers, nitriles, amides, and halogen substituted derivatives of these. The non-aqueous electrolyte may contain one of these non-aqueous solvents, or two or more kinds thereof. Examples of the halogen substituted derivatives include fluorides.

The ester may be, for example, a carbonic ester, a carboxylic acid ester, and the like. Examples of a cyclic carbonic ester include ethylene carbonate, propylene carbonate, and fluoroethylene carbonate (FEC). Examples of a chain carbonic ester include dimethyl carbonate (DMC), ethyl methyl carbonate (EMC), and diethyl carbonate. Examples of a cyclic carboxylic acid ester include γ-butyrolactone and γ-valerolactone. Examples of a chain carboxylic acid ester include ethyl acetate, methyl propionate, and methyl fluoropropionate.

The ether may be a cyclic or chain ether. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

The lithium salt concentration in the non-aqueous electrolyte is, for example, 0.5 mol/L or more and 3.5 mol/L or less. The anion concentration in the non-aqueous electrolyte may be set to 0.5 mol/L or more and 3.5 mol/L or less. The oxalate complex anion concentration in the non-aqueous electrolyte may be set to 0.05 mol/L or more and 1 mol/L or less.

The non-aqueous electrolyte may include an additive. The additive may form a surface film on the negative electrode. When the surface film derived from the additive is formed on the negative electrode, the dendrite formation and growth tend to be suppressed. Examples of the additive include vinylene carbonate, FEC, and vinyl ethyl carbonate (VEC).

[Lithium Secondary Battery]

A description will be given below of a configuration of a lithium secondary battery according to the present disclosure with reference to the drawings, with a cylindrical battery having a wound electrode group taken as an example. It is to be noted, however, that the present disclosure is not limited to the following configuration.

Figure 9:
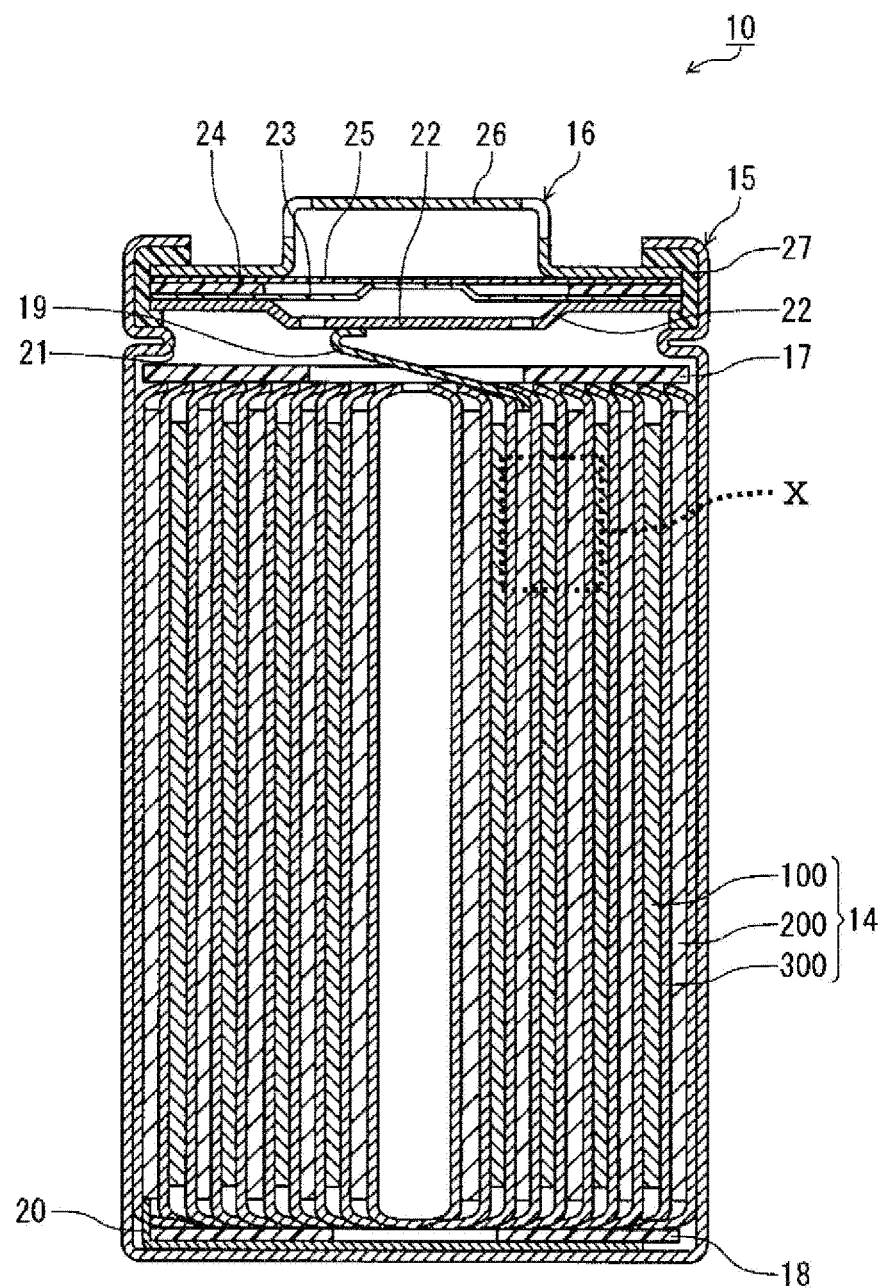
FIG. 9 A schematic longitudinal cross-sectional view of a lithium secondary battery according to one embodiment of the present disclosure.

FIG. 9 is a schematic longitudinal cross-sectional view of a lithium secondary battery 10. The lithium secondary battery 10 is a cylindrical battery including a cylindrical battery case, a wound electrode group 14 housed in the battery case, and a non-aqueous electrolyte (not shown). The battery case comprises a case main body 15 which is a bottomed cylindrical metal container, and a sealing body 16 sealing an opening of the case main body 15. The case main body 15 has an annular step portion 21 formed by partially pressing from outside the sidewall of the case main body in the vicinity of the opening. The sealing body 16 is supported on the surface of the step portion 21 on the opening side. Between the case main body 15 and the sealing body 16, a gasket 27 is placed, by which the hermeticity of the battery case is secured. Within the case main body 15, electrically insulating plates 17 and 18 are placed respectively at both ends of the electrode group 14 in the winding axis direction.

The sealing body 16 includes a filter 22, a lower valve body 23, an electrically insulating member 24, an upper valve body 25, and a cap 26. The cap 26 is disposed outside the case main body 15, and the filter 22 is disposed inside the case main body 15. The lower valve body 23 and the upper valve body 25 are connected to each other at the center portion of each, and are interposed by the insulating member 24 at the peripheral portion of each. The filter 22 and the lower valve body 23 are connected to each other at the peripheral portion of each. The upper valve body 25 and the cap 26 are connected to each other at the peripheral portion of each. The lower valve body 23 is provided with an air vent hole. When the internal pressure of the battery case rises due to abnormal heat generation or other events, the upper valve body 25 bulges toward the cap 26 and spaced away from the lower valve body 23, which breaks the electrical connection between the lower valve body 23 and the upper valve body 25. Furthermore, when the internal-pressure further rises, the upper valve body 25 raptures, to let gas go out though an aperture provided in the cap 26.

The electrode group 14 includes a positive electrode 100, a negative electrode (negative electrode current collector) 200, and a separator 300. The positive electrode 100, the negative electrode 200, and the separator 300 interposed therebetween are all belt-like shaped, and are wound spirally together such that the width direction of each of them is in parallel with the winding axis direction.

The positive electrode 100 is electrically connected via a positive electrode lead 19 to the cap 26 serving as a positive electrode terminal. One end of the positive electrode lead 19 is connected to the positive electrode 100, for example, at somewhere around its center in the longitudinal direction. The other end of the positive electrode lead 19 extended from the positive electrode 100 is passed through a through-hole provide in the insulating plate 17 and welded to the inner side surface of the filter 22.

The negative electrode 200 is electrically connected via a negative electrode lead 20 to the case main body 15 serving as a negative electrode terminal. One end of the negative electrode lead 20 is connected to the negative electrode 200, for example, at its end in the longitudinal direction, and the other end thereof is welded to the inner bottom surface of the case main body 15.

Figure 10A:
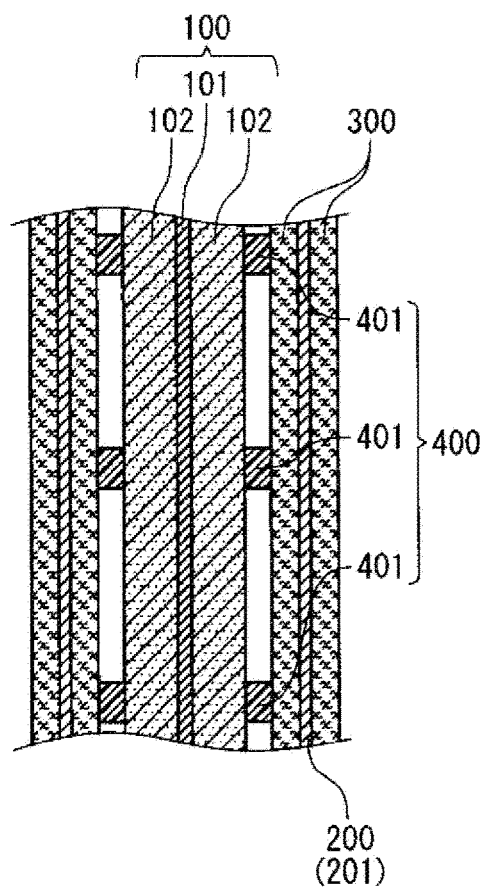
FIGS. 10a and 10b A schematic enlarged view of an essential part of the lithium secondary battery of FIG. 9.
Figure 10B:
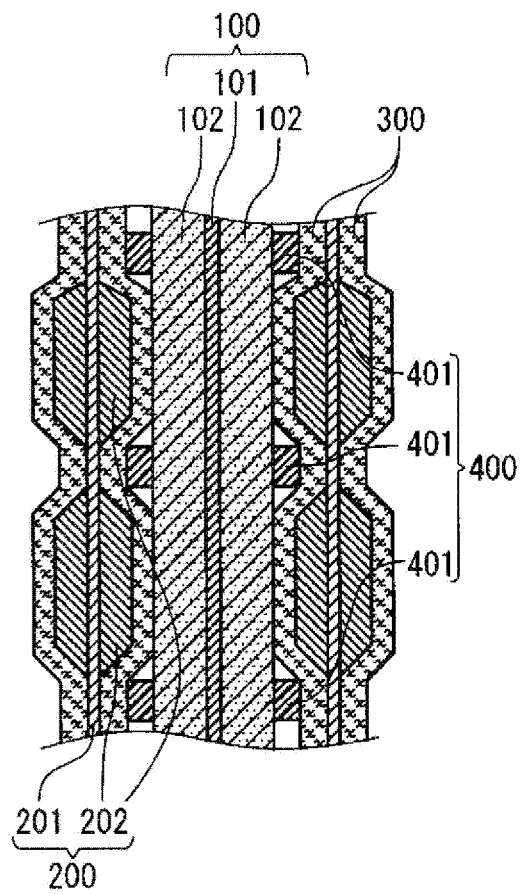

FIGS. 10a and 10b are a schematic enlarged view of a region X surrounded by a broken line in FIG. 9, in which FIG. 10a illustrates the battery in a discharged state, and FIG. 10b illustrates the battery in a charged state. The positive electrode 100 includes a positive electrode current collector 101 and a positive electrode mixture layer 102 (see FIGS. 10a and 10b). A plurality of spacers 400 are disposed between the positive electrode mixture layer 102 and the separator 300. The spacers 400 consist of line-shaped protruding portions 401 provided along a second direction D2 (longitudinal direction) of the positive electrode 100. In a discharged state FIG. 10a, no lithium metal is deposited on a surface of a negative electrode current collector 201, and a space is secured between the positive electrode 100 and the separator 300. On the other hand, in a charged state FIG. 10b, lithium metal 202 is deposited on the surface of the negative electrode current collector 201 and, under being subjected to a pressing pressure from the separator 300, stored in the space between the positive electrode 100 and the separator 300. In short, the negative electrode 200 in a discharged state includes the negative electrode current collector 201, and in a charged state, includes the negative electrode current collector 201 and the lithium metal 202 deposited thereon.

Since the lithium metal 202 is stored in the space formed between the positive electrode 100 and the separator 300, apparent changes in the volume of the electrode group associated with the deposition of lithium metal during charge-discharge cycles can be reduced. Accordingly, the stress that the negative electrode current collector 201 undergoes can be reduced. Moreover, since the lithium metal 202 stored between the positive electrode 100 and the separator 300 is subjected to a pressure from the separator 300, the lithium metal 202 can deposit in a controlled manner, and an isolation of lithium metal is unlikely to occur. This can suppress the reduction in charge-discharge efficiency.

Although the illustrated example is a cylindrical lithium secondary battery including a wound electrode group, the shape and the like of the lithium secondary battery is not limited thereto, and may be selected according to its use and the like from various shapes, such as cylindrical, coin, square, sheet, and flat shapes. The electrode group also may be in any form, and may be in the form of a stack. The component elements other than the electrode group and the non-aqueous electrolyte of the lithium secondary battery may have any known configuration.

EXAMPLES

The lithium secondary battery according to the present disclosure will be described more specifically with reference to Examples and Comparative Examples. It is to be noted, however, the present disclosure is not limited to the following Examples.

Examples 1 to 5

(1) Production of Positive Electrode

A lithium-containing transition metal oxide having a layered rock-salt structure and containing Li, Ni, Co, and Al such that the mole ratio of Li to the total of Ni, Co, and Al was 1.0 (NCA; positive electrode active material), acetylene black (AB; conductive material), and polyvinylidene fluoride (PVdF; binder) were mixed in a mass ratio of NCA: AB:PVdF=95:2.5:2.5, to which N-methyl-2-pyrrolidone (NMP) was added in an appropriate amount and stirred, to prepare a positive electrode mixture slurry. The prepared positive electrode mixture slurry was applied to both surfaces of an Al foil (positive electrode current collector), and then dried and passed between rolls so that the applied film of the positive electrode mixture is rolled to a certain thickness. Lastly, the resultant stack of the positive electrode current collector and the positive electrode mixture was cut in a predetermined electrode size, to give a positive electrode in which a positive electrode mixture layer is formed on both surfaces of the positive electrode current collector.

(2) Formation of Spacer

A polyimide ink was applied along the second direction D2 at both ends in the first direction D1 on each of both surfaces of the positive electrode mixture layer and midway between the both ends, and then dried with hot air, to form a spacer consisting of three parallel line-shaped protruding portions formed of a polyimide resin. The polyimide ink was applied using a dispenser.

(3) Production of Negative Electrode

A rectangular electrolytic copper foil (thickness: 15 μm) was prepared as a negative electrode current collector.

(4) Preparation of Non-Aqueous Electrolyte

Ethylene carbonate (EC) and dimethyl carbonate (DMC) were mixed in a volume ratio of EC:DMC=30:70. To the resultant mixed solvent, $LiPF_6$ and $LiBF_2(C_2O_4)$ were dissolved at a concentration of 1 mol/L and 0.1 mol/L, respectively, to prepare a liquid non-aqueous electrolyte.

(5) Fabrication of Battery

The positive electrode with the spacer formed on both surfaces and the negative electrode current collector were spirally wound in an inert atmosphere with a separator (microporous film) made of polyethylene interposed therebetween, to form an electrode group. Here, the lithium contained in the electrode group was all derived from the positive electrode. Therefore, a molar ratio mLi/mM of a total amount mLi of the lithium present in the positive and negative electrodes to an amount mM of the metal M (here, Ni, Co, and Al) present in the positive electrode was 1.0.

The electrode group was housed in a pouch-like outer case formed of a laminate sheet having an Al layer, into which the non-aqueous electrolyte was injected. Thereafter, the outer case was sealed, to complete a lithium secondary battery.

Here, batteries A1 to A5 of Examples 1 to 5 were produced by controlling the width and the height of the protruding portions in the spacer formation process (2). Specifically, the height h of the protruding portions from the positive electrode mixture layer surface, the shortest distance d between the protruding portions adjacent to each other in the first direction D1, the ratio (s/S) of an area s of a portion covered with the spacer of the positive electrode mixture layer to the opposing area S between the positive electrode and the negative electrode, and the ratio (l/L) of the length of the spacer to the first length were controlled to be as shown in Table 1.

Comparative Example 1

A battery B1 was produced similarly to the battery A4 of Example 4, except that no spacer was formed on the positive electrode mixture layer, and the spacer was formed on both surfaces of the negative electrode current collector, in the regions corresponding to both ends in the first direction D1 of the positive electrode mixture layer and midway between the both ends.

Comparative Example 2

A battery B2 was produced similarly to the battery A4 of Example 4, except that the protruding portion was formed only at both ends in first direction D1 on both surfaces of the positive electrode mixture layer, and no protruding portion was formed midway between the both ends.

[Evaluation]

The obtained batteries were subjected to a charge-discharge test for evaluation.

In the charge-discharge test, in a 25° C. constant-temperature bath, three batteries each were charged under the conditions below, and after left to stand for 20 min, discharged under the conditions below. This cycle was repeated 25 cycles in total. A ratio (MR25) of a discharge capacity at the 25th cycle to a discharge capacity at the 1st cycle was determined as a capacity retention ratio (%).

(Charge)

A constant-current charge was performed until the battery voltage reached 4.3 V at a current of 10 mA per unit area (square centimeters) of the electrode, and then a constant-voltage charge was performed at a voltage of 4.3 V until the current value per unit area of the electrode reached 1 mA.

(Discharge)

A constant-current discharge was performed until the battery voltage reached 3.0 V at a current of 10 mA per unit area of the electrode.

Of the three batteries, the number of batteries (N) in which a cycling failure occurred presumably because of a crack in the negative electrode current collector was determined. When the cycling failure occurred in some of the batteries, the MR25 was determined as an average of the values of the remaining batteries.

|  | Location of spacer | Number of protruding portions | h (μm) | d (mm) | d/h | s/S | l/L | MR25 (%) | N |
|---|---|---|---|---|---|---|---|---|---|
| A1 | Positive electrode | 3 | 15 | 12 | 800 | 0.2 | 0.2 | 75.7 | 1 |
| A2 | Positive electrode | 3 | 30 | 12 | 400 | 0.05 | 0.05 | 68.7 | 0 |
| A3 | Positive electrode | 3 | 30 | 12 | 400 | 0.1 | 0.1 | 71.6 | 0 |
| A4 | Positive electrode | 3 | 30 | 12 | 400 | 0.2 | 0.2 | 76.9 | 0 |
| A5 | Positive electrode | 3 | 60 | 12 | 200 | 0.2 | 0.2 | 82.3 | 1 |
| B1 | Negative electrode | 3 | 30 | 12 | 400 | 0.2 | 0.2 | 58.8 | 2 |
| B2 | Positive electrode | 2 | 30 | 26 | 867 | 0.133 | 0.133 | 65.7 | 2 |

Of the batteries B1, the battery in which the cycling failure occurred was disassembled to observe the negative electrode current collector. The observation found a large number of cracks running in the first direction, the cracks having the same length as the first length. Of the batteries B2, the battery in which the cycling failure occurred was disassembled to observe the negative electrode current collector. The observation found a large number of cracks running in the first direction, the cracks being slightly shorter than those in the battery B1 but having almost the same length as the first length. In contrast, the observation of the negative electrode current collector taken out from the batteries A1 and A5 found minor cracks, but the cracks were short in length and were not so severe to cause breakage. Furthermore, as compared to the batteries B1 and B2 of Comparative Examples, the batteries in which the protruding portions were provided on the positive electrode (A1 to A5 and B2) generally showed a good MR25 value.

INDUSTRIAL APPLICABILITY

The lithium secondary battery of the present disclosure is suitably applicable for electronic devices, such as cellular phones, smart phones, and tablet terminals, electric vehicles including hybrids and plug-in hybrids, and home storage battery systems combined with a solar cell.

REFERENCE SIGNS LIST 10 lithium secondary battery
14 electrode group
15 case main body
16 sealing body
17, 18 insulating plate
19 positive electrode lead
20 negative electrode lead
21 step portion
22 filter
23 lower valve body
24 insulative member
25 upper valve body
26 cap
27 gasket
100 positive electrode
101 positive electrode current collector
102 positive electrode mixture layer
200 negative electrode
201 negative electrode current collector
202 lithium metal
300 separator
400 spacer
401 protruding portion

The invention claimed is:

1. A lithium secondary battery using a lithium metal as a negative electrode active material, comprising:
   a positive electrode including a positive electrode current collector, and a positive electrode mixture layer containing a positive electrode active material;
   a negative electrode including a negative electrode current collector that faces the positive electrode;
   a separator disposed between the positive electrode and the negative electrode; and
   a non-aqueous electrolyte having lithium ion conductivity, wherein
   the positive electrode active material includes a composite oxide containing lithium and a metal M other than lithium, the metal M containing at least a transition metal,
   lithium metal deposits on the negative electrode during charge, and the lithium metal dissolves from the negative electrode during discharge,
   the positive electrode current collector has a first length in a first direction D1 and a second length in a second direction D2 intersecting the first direction, the first length being shorter than the second length,
   a spacer is provided between the positive electrode and the separator so as to form a space for storing the lithium metal, between the positive electrode and the negative electrode, and
   a straight line SL is drawable along the first direction D1 so as to pass through three or more points of the spacer, wherein
   in the straight line SL passing through three or more points of the spacer, a ratio d/h of a shortest distance d between portions of the spacer adjacent to each other to a height h of the spacer as measured from a portion having a maximum thickness of the positive electrode is 10 to 800.

2. The lithium secondary battery according to claim 1, wherein the spacer has the height h of 15 μm to 100 μm.

3. The lithium secondary battery according to claim 2, wherein in the straight line SL passing through three or more points of the spacer, a ratio d/h of a shortest distance d between portions of the spacer adjacent to each other to the height h of the spacer as measured from a portion having a maximum thickness of the positive electrode is 40 to 400.

4. The lithium secondary battery according to claim 1, wherein when an opposing area S between the positive electrode and the negative electrode is denoted by S, a ratio of an area s of a positive electrode portion covered with the spacer to the opposing area S is 5% to 20%.

5. The lithium secondary battery according to claim 1, wherein a ratio of a length occupied by the spacer in the straight line SL passing through three or more points of the spacer to the first length is 5% to 20%.

6. The lithium secondary battery according to claim 1, wherein the spacer comprise a plurality of line-shaped protruding portions disposed in stripes along the second direction D2 on a surface of the positive electrode.

7. The lithium secondary battery according to claim 6, wherein the protruding portions are respectively disposed at both ends in the first direction of the surface of the positive electrode and between the both ends.

8. The lithium secondary battery according to claim 1, wherein
the non-aqueous electrolyte contains lithium ion and an anion, and
the anion includes at least an anion of an oxalate complex.

9. The lithium secondary battery according to claim 2, wherein in the straight line SL passing through three or more points of the spacer, a ratio d/h of a shortest distance d between portions of the spacer adjacent to each other to the height h of the spacer as measured from a portion having a maximum thickness of the positive electrode is more than 200 and 800 or less.

10. A lithium secondary battery using a lithium metal as a negative electrode active material, comprising:
   a positive electrode including a positive electrode current collector, and a positive electrode mixture layer containing a positive electrode active material;
   a negative electrode including a negative electrode current collector that faces the positive electrode;
   a separator disposed between the positive electrode and the negative electrode; and
   a non-aqueous electrolyte having lithium ion conductivity, wherein
   the positive electrode active material includes a composite oxide containing lithium and a metal M other than lithium, the metal M containing at least a transition metal,
   lithium metal deposits on the negative electrode during charge, and the lithium metal dissolves from the negative electrode during discharge,
   the positive electrode current collector has a first length in a first direction D1 and a second length in a second direction D2 intersecting the first direction, the first length being shorter than the second length,
   a spacer is provided between the positive electrode and the separator, and
   a straight line SL is drawable along the first direction D1 so as to pass through three or more points of the spacer, wherein
   the spacer includes a plurality of ribs,
   when viewed from a direction perpendicular to the first direction D1 and perpendicular to the second direction D2, the plurality of ribs are continuous and arranged on a honeycomb shape, wherein
   in the straight line SL passing through three or more points of the spacer, a ratio d/h of a shortest distance d between portions of the spacer adjacent to each other to a height h of the spacer as measured from a portion having a maximum thickness of the positive electrode is 10 to 800.

11. The lithium secondary battery according to claim 10, wherein the spacer has a height h of 15 μm to 100 μm, the height h being measured from a portion having a maximum thickness of the positive electrode.

12. The lithium secondary battery according to claim 10, wherein the ratio d/h is more than 200 and 800 or less.

13. The lithium secondary battery according to claim 10, wherein the ratio d/h is more than 40 and 400 or less.

14. The lithium secondary battery according to claim 10, wherein when an opposing area S between the positive electrode and the negative electrode is denoted by S, a ratio of an area s of a positive electrode portion covered with the spacer to the opposing area S is 5% to 20%.

15. The lithium secondary battery according to claim 10, wherein a ratio of a length occupied by the spacer in the straight line SL passing through three or more points of the spacer to the first length is 5% to 20%.

16. The lithium secondary battery according to claim 10, wherein
the non-aqueous electrolyte contains lithium ion and an anion, and
the anion includes at least an anion of an oxalate complex.

* * * * *